US012403766B2

(12) United States Patent
Aurand et al.

(10) Patent No.: US 12,403,766 B2
(45) Date of Patent: Sep. 2, 2025

(54) METHOD FOR OPERATING A VEHICLE

(71) Applicant: Daimler Truck AG, Leinfelden-Echterdingen (DE)

(72) Inventors: Tobias Aurand, Ludwigsburg (DE); Markus Zimmer, Leinfelden-Echterdingen (DE)

(73) Assignee: Daimler Truck AG, Leinfelden-Echterdingen (DE)

( * ) Notice: Subject to any disclaimer, the term of this patent is extended or adjusted under 35 U.S.C. 154(b) by 265 days.

(21) Appl. No.: 17/638,658

(22) PCT Filed: Jul. 30, 2020

(86) PCT No.: PCT/EP2020/071561
§ 371 (c)(1),
(2) Date: Feb. 25, 2022

(87) PCT Pub. No.: WO2021/037474
PCT Pub. Date: Mar. 4, 2021

(65) Prior Publication Data
US 2022/0297541 A1    Sep. 22, 2022

(30) Foreign Application Priority Data
Aug. 30, 2019    (DE) ............ 10 2019 006 122.5

(51) Int. Cl.
*B60K 28/06* (2006.01)
*B60Q 1/52* (2006.01)
(Continued)

(52) U.S. Cl.
CPC ............ *B60K 28/066* (2013.01); *B60Q 1/52* (2013.01); *B60W 30/06* (2013.01); *B60W 30/08* (2013.01);
(Continued)

(58) Field of Classification Search
CPC ........ B60K 28/06; B60K 28/066; B60Q 1/52; B60W 10/18; B60W 30/06; B60W 30/08;
(Continued)

(56) References Cited

U.S. PATENT DOCUMENTS 9,776,631 B1    10/2017 Domeyer et al.
2013/0018549 A1*  1/2013 Kobana .............. B60K 28/06
                                                    701/41
(Continued)

FOREIGN PATENT DOCUMENTS

CN    104136260 A    11/2014
CN    105452044 A    3/2016
(Continued)

OTHER PUBLICATIONS

English-language Chinese Office Action issued in Chinese Application No. 202080059726.6 dated Jun. 30, 2023 (3 pages).
(Continued)

*Primary Examiner* — Navid Z. Mehdizadeh
*Assistant Examiner* — Caitlin R McCleary
(74) *Attorney, Agent, or Firm* — Crowell & Moring LLP

(57) ABSTRACT

A method for operating a vehicle includes continuously checking during a driving operation whether an emergency situation is present in the vehicle and, when an emergency situation is detected, initiating an emergency stopping maneuver for safely parking the vehicle, signalling the emergency situation to a road user in a surroundings of the vehicle, and aborting the emergency stopping maneuver when a vehicle user takes over a task of driving the vehicle. The method further includes automatically deactivating the signalling of the emergency situation when an ascertained duration of time between the initiating and the aborting of the emergency stopping maneuver is smaller than a predeterminable time value and/or when an ascertained reduction
(Continued)

of a driving speed of the vehicle between the initiating and the aborting of the emergency stopping maneuver is smaller than a predeterminable speed reduction value.

8 Claims, 1 Drawing Sheet

(51) Int. Cl.
*B60W 30/06* (2006.01)
*B60W 30/08* (2012.01)
*B60W 50/10* (2012.01)

(52) U.S. Cl.
CPC ......... *B60W 50/10* (2013.01); *B60W 2520/10* (2013.01); *B60W 2540/229* (2020.02)

(58) Field of Classification Search
CPC .. B60W 30/09; B60W 50/10; B60W 2520/10; B60W 2540/229; B60W 2540/26; B60Y 2302/05
See application file for complete search history.

(56) References Cited

U.S. PATENT DOCUMENTS

| | | | | |
|---|---|---|---|---|
| 2016/0071418 A1* | 3/2016 | Oshida | ............... | B60K 28/06 701/23 |
| 2016/0107644 A1* | 4/2016 | Eigel | ............... | B62D 15/0265 701/70 |
| 2017/0158054 A1* | 6/2017 | Munaoka | ............... | B60Q 5/005 |
| 2017/0297569 A1* | 10/2017 | Nilsson | ............... | B60W 60/0061 |
| 2017/0369043 A1* | 12/2017 | Otake | ............... | G08B 21/06 |
| 2017/0369044 A1* | 12/2017 | Otake | ............... | B60T 17/22 |
| 2018/0037215 A1* | 2/2018 | Otake | ............... | B60W 30/18054 |
| 2018/0134262 A1* | 5/2018 | Kurahashi | ............... | B60K 35/22 |
| 2019/0129416 A1* | 5/2019 | Upmanue | ............... | B60W 50/14 |
| 2019/0389457 A1* | 12/2019 | Mielenz | ............... | B60W 50/0097 |
| 2020/0130654 A1* | 4/2020 | Kamada | ............... | B60W 40/02 |

FOREIGN PATENT DOCUMENTS

| | | |
|---|---|---|
| DE | 10 2008 031 258 A1 | 1/2009 |
| DE | 10 2011 086 241 A1 | 5/2013 |
| DE | 10 2012 206 725 A1 | 10/2013 |
| DE | 10 2013 009 422 A1 | 12/2014 |
| DE | 10 2013 222 048 A1 | 4/2015 |
| DE | 10 2015 015 097 A1 | 5/2016 |
| DE | 10 2015 003 124 A1 | 9/2016 |
| DE | 10 2016 210 452 A1 | 12/2017 |
| DE | 10 2016 219 340 A1 | 4/2018 |

OTHER PUBLICATIONS

PCT/EP2020/071561, International Search Report dated Nov. 19, 2020 (Two (2) pages).

German-language German Office Action issued in German application No. 10 2019 006 122.5 dated Jul. 7, 2020 (Seven (7) pages).

* cited by examiner

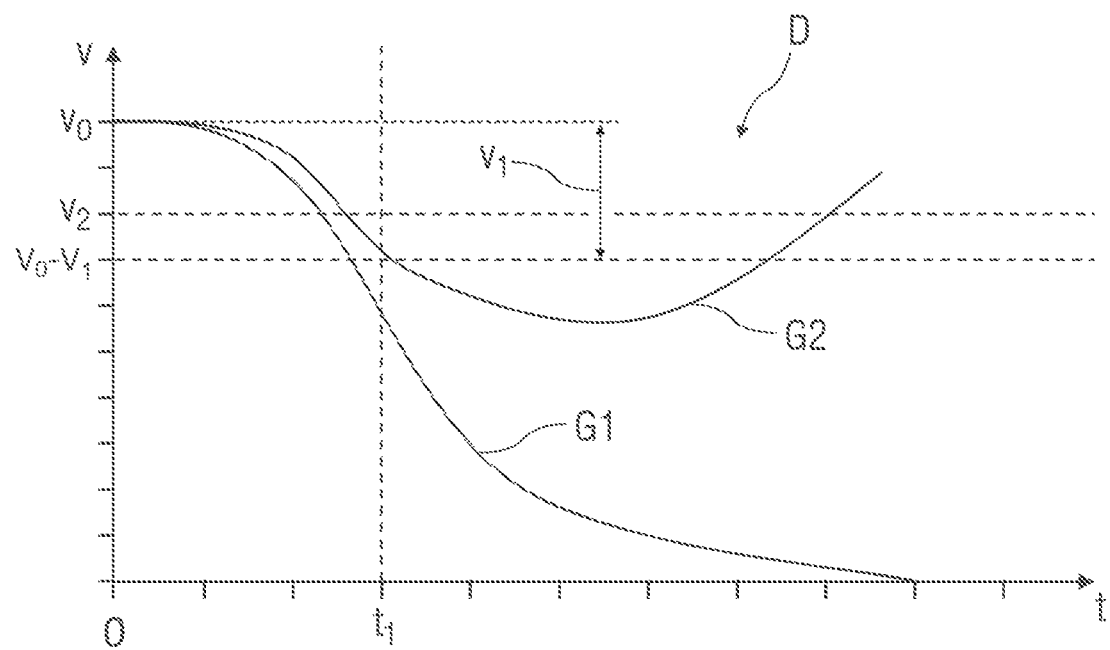

METHOD FOR OPERATING A VEHICLE

BACKGROUND AND SUMMARY OF THE INVENTION

The invention relates to a method for operating a vehicle, wherein it is continuously checked during driving operation as to whether an emergency situation is present in the vehicle and, if an emergency situation is detected, an emergency stopping maneuver is initiated to safely park the vehicle, wherein the presence of an emergency situation is signalled to road users in the surroundings of the vehicle, and the emergency stopping maneuver is aborted when a vehicle user assumes a driving task of the vehicle.

A computing unit and a method for safely parking a vehicle are known from DE 10 2011 086 241 A1. Here, it is checked as to whether an emergency situation is present, wherein a driver assistance system drives the vehicle to the edge of the road after recognizing an emergency situation. In addition, information is retrieved from an external database and taken into consideration by the driver assistance system.

Moreover, DE 10 2015 015 097 A1 describes a method for operating a vehicle, in which a warning notification is emitted to a driver of the vehicle when a hands-free situation is recognized after a predetermined period of time. The warning notification comprises a request to place at least one hand of the driver on the steering wheel of the vehicle. An emergency stopping assistant is activated when there is still a hands-free situation after a further predetermined period of time following the warning notification emitted. When the emergency stopping assistance is activated, an actual speed of the vehicle is reduced with a delay in at least two reduction stages until the vehicle has come to a standstill or the emergency stopping assistance is deactivated. In addition, a hazard light device is activated when the actual speed of the vehicle does not meet a predetermined threshold value when the emergency stopping assistance is activated.

The object of the invention is to specify an improved method over the prior art for operating a vehicle.

A method for operating a vehicle provides that it is continuously checked during driving operation as to whether an emergency situation is present in the vehicle and, if an emergency situation is detected, an emergency stopping maneuver is initiated to safely park the vehicle, wherein the presence of an emergency situation is signalled to road users in the surroundings of the vehicle, and the emergency stopping maneuver is aborted when a vehicle user assumes a driving task of the vehicle. According to the invention, the signalling of the emergency situation is automatically deactivated when a period of time between initiating and aborting the emergency stopping maneuver is smaller than a predeterminable time value and/or when a reduction of a vehicle speed of the vehicle between initiating and aborting the emergency stopping maneuver is smaller than a predeterminable speed reduction value.

Signalling the emergency situation is thus deactivated when a period of time of the emergency stopping maneuver is smaller than the predeterminable time value and/or when a speed reduction during the emergency stopping maneuver is smaller than a predeterminable speed reduction value. Here, period of time of the emergency stopping maneuver is to be understood as the period of time between initiating and aborting the emergency stopping maneuver, and speed reduction during the emergency stopping maneuver is to be understood as the reduction of the driving speed of the vehicle between initiating and aborting the emergency stopping maneuver.

When the vehicle user assumes the driving task after initiating the emergency stopping maneuver and thus aborts the emergency stopping maneuver, it is ascertained by using the method as to whether the vehicle constitutes a possible danger to the road users in the surroundings of the vehicle as a result of the reduced vehicle speed due to the emergency stopping maneuver. If a criterion or both criteria is/are fulfilled, the signalling is automatically deactivated immediately, such that it is not necessary for the vehicle user to manually reverse the signalling. The signalling is otherwise continued, preferably until it is manually reversed by the vehicle user, or until a predetermined reverse condition is fulfilled. The predetermined reverse condition can be, for example, the end of a predetermined post-warning time after aborting the emergency stopping maneuver.

In an advantageous design of the method, the return condition comprises the condition that the signalling is automatically deactivated when the vehicle is accelerated to a driving speed after exceeding the predeterminable speed reduction value, the driving speed exceeding a predeterminable speed value. This means, when the vehicle user aborts the emergency stopping maneuver at a point in time when the period of time of the emergency stopping maneuver is greater than the predeterminable time value and/or when the speed reduction during the emergency stopping maneuver is greater than the predeterminable speed reduction value, the signalling is initially continued after aborting the emergency stopping maneuver and is only automatically deactivated when the vehicle is accelerated to the extent that the predeterminable speed value is exceeded. In such a case, it is assumed that, due to the acceleration and the driving speed of the vehicle increase caused by it, it no longer constitutes a danger to the road users in the surroundings.

In a further possible design of the method, a hands-free drive of a driver of the vehicle and a period of time of the hands-free drive are detected to ascertain an emergency situation. Here, it is detected, for example, as to whether the vehicle user holds on to a steering wheel with at least one hand. If the vehicle user does not have their hands on the steering wheel, it may be that the vehicle user is unconscious or has fallen asleep, such that an emergency situation is present since, in such a case, the vehicle is driving without a driver.

In a further possible design of the method, the emergency stopping maneuver is initiated when the period of time of hands-free driving exceeds a predetermined time threshold value. Here, the time threshold value is chosen, for example, in such a way that the vehicle can be transferred to a safer standstill by means of the emergency stopping maneuver without there substantially being a considerable danger to the vehicle, its vehicle user and the road users in the surroundings of the vehicle. For example, the time threshold value is 60 seconds.

In a further possible design of the method, a hazard light and/or a dipped beam of the vehicle is activated as the signalling, such that the road users in the surroundings of the vehicle are informed that the vehicle is carrying out an automatic emergency stopping maneuver. For example, the road users are made aware by means of the activated hazard light and/or dipped beam that an emergency situation is present and it is not an instance of braking carried out in the normal way.

In order to determine hands-free driving, a state of health and/or a state of attentiveness of the vehicle user, in a further possible design of the method, they are monitored by means of received image data of a driver observation camera. Here, such a monitoring of the vehicle user constitutes a comparably reliable method.

In a present emergency situation and the emergency stopping maneuver initiated, the vehicle is decelerated in a further possible design of the method in its current driving lane until the vehicle reaches a standstill. The vehicle maintains its driving direction, such that it can be at least extensively impossible for the vehicle to drive into other driving lanes and thus constitute a danger to itself and the road users in the surroundings of the vehicle.

A further possible design of the method provides that, when carrying out the emergency stopping maneuver, the driving speed of the vehicle is reduced while taking further road users in the surroundings of the vehicle into consideration. For example, it is provided for this that the driving speed is not abruptly reduced, as in a dangerous deceleration, such that both a risk of injury to the vehicle user and, optionally, further occupants of the vehicle and following vehicles can be extensively precluded.

Exemplary embodiments of the invention are explained in more detail below by means of a drawing.

BRIEF DESCRIPTION OF THE DRAWING

The FIGURE, schematically, shows a driving speed-time diagram of a driving speed of a vehicle after initiating an emergency stopping maneuver.

DETAILED DESCRIPTION OF THE DRAWING

In the single FIGURE, a driving speed-time diagram D is depicted, wherein a driving speed v of a vehicle not depicted in more detail is plotted on the ordinate and the time t on the abscissa. Here, the time t constitutes a duration of time which has elapsed since initiating an emergency stopping maneuver. Here, a predeterminable time value is labelled with $t_1$. A current driving speed v of the vehicle at the point in time of initiating the emergency stopping maneuver is labelled with $v_0$. This speed $v_0$ is also referred to below as reference speed. A predeterminable speed reduction value that represents a speed difference based on the reference speed $v_0$ is labelled with $v_1$. A predeterminable speed value is labelled with $v_2$. The predeterminable speed reduction value $v_1$ can be predetermined as an absolute value, for example as 30 km/h, or can be predetermined as a relative value relating to the reference sped $v_0$, e.g., as 30% of the reference speed $v_0$. Similarly, the predeterminable speed value $v_2$ can be predetermined as an absolute value, e.g., as 80 km/h, or can be predetermined as a relative value based on the reference speed $v_0$, e.g., as 80% of the reference speed $v_0$. By way of example, the curves G1 and G2 show two speed courses of the vehicle speed v of the vehicle.

When activating an emergency stop assistant due to detecting an emergency situation, a deceleration is automatically carried out as the emergency stopping maneuver in order to bring the vehicle to a safe standstill. As a result of the emergency stopping maneuver, a driving speed v of the vehicle is reduced, such that the vehicle can potentially pose a threat to road users in its surroundings due to its low speed in comparison to the rest of the flow of traffic. In order to make the road users aware of the fact that an emergency situation is present and the vehicle is carrying out an emergency stopping maneuver, a corresponding signalling takes place, for example by activating a hazard light and/or a dipped beam.

If the emergency stopping maneuver is aborted by a vehicle user assuming a driving task, it is necessary to deactivate the signalling if the vehicle no longer poses a threat to the road users in the surroundings of the vehicle.

A method is described below for a basis of decision making, on the basis of which it is ascertained whether or not the deactivation of the signalling is carried out.

If the vehicle and an assistance system for avoiding lane departure is activated, then it is continuously ascertained during the driving operation as to whether the vehicle user is holding on with at least one hand to a steering wheel of the vehicle.

To do so, recorded image data of a driver observation camera and/or recorded signals of another suitable sensory system are evaluated in order to recognize whether at least one hand of the vehicle user is on the steering wheel. For example, corresponding sensors are integrated into the steering wheel. For example, a hand steering moment exerted by the vehicle user on the steering wheel can be ascertained by means of sensors and, in the event of no hand steering moment, a hands-free situation is concluded.

If it is ascertained by means of the recorded image data and/or by means of signals recorded in a different way that the vehicle user has not been holding on to the steering wheel with both hands and not even with one hand for more than 60 seconds, this is recorded as an emergency situation and the emergency stopping maneuver is initiated. For example, the vehicle user may have fallen asleep or be unconscious.

When initiating the emergency stopping maneuver, the vehicle is decelerated, as shown by the speed course G1, from its current speed $v_0$ at the point in time of initiating the emergency stopping maneuver to a standstill, wherein when initiating the emergency stopping maneuver, a hazard light and/or a dipped beam of the vehicle are or is automatically activated in order to make road users in the surroundings of the vehicle aware of the initiated emergency stopping maneuver and the deceleration connected with this. During the emergency stopping maneuver, the vehicle is advantageously held in its driving lane, i.e., it is brought to a standstill in its driving lane. Yet it is also conceivable that the vehicle carries out an automatic lane change to an optionally present outer driving lane or an optionally present hard shoulder or into an optionally present lay-by. Here, in countries with right-hand driving, the outer driving lane is to be understood as the right-hand driving lane, in countries with left-hand driving it is to be understood as the left-hand driving lane. By activating the hazard light and/or dipped beam, the road users in the surroundings of the vehicle are made aware of the fact that it is not a normal deceleration but rather an emergency situation.

If, contrary to expectations, the vehicle user is able to take over the task of driving during the emergency stopping maneuver, for example because they have woken up, the emergency stopping maneuver can be ended by fulfilling a so-called aborting criterion.

If it is ascertained that the reduction of the current driving speed v of the vehicle at the point in time of the vehicle user taking over the task of driving is smaller than a predetermined speed reduction value $v_1$, the signalling is deactivated automatically, as is depicted by means of a first speed course G1. The signalling in the form of a warning indictor is then thus returned to its original value.

Reducing the current driving speed v of the vehicle at the point in time of the vehicle user taking over the task of driving is here to be understood as the reduction of the driving speed v between the initiation of the emergency stopping maneuver and resultingly aborting the emergency stopping maneuver by the vehicle user taking over the task of driving, i.e., the speed decrease during the emergency stopping maneuver.

If it is ascertained that the reduction of the current driving speed v at the point in time of taking over the task of driving exceeds the predetermined speed reduction value $v_1$, then the vehicle can pose a threat to the road users in the surroundings of the vehicle, in particular for following road users, due to its current low driving speed v, and the hazard light and/or the dipped beam remain or remains activated. The deactivation of the hazard light and/or the dipped beam is then carried out manually by the vehicle user themselves, wherein the vehicle user actuates operating elements corresponding to this in the vehicle.

An alternative or additional possibility to the alternative described above for deactivating the hazard light and/or the dipped beam when the vehicle user successfully takes over the task of driving during the emergency stopping maneuver is described by means of a subsequent embodiment.

If the vehicle user has taken over the task of driving during the emergency stopping maneuver and a duration of time from initiating until aborting the emergency stopping maneuver does not meet a predetermined time value $t_1$ depending on speed, then the signalling is automatically deactivated.

If the duration of time from initiating to aborting the emergency stopping maneuver exceeds the predetermined time value $t_1$ dependent on speed, then no automatic deactivation of the signalling is carried out, such that this is maintained, as is shown by means of a second speed curve G2. The vehicle user then has to deactivate the signalling by actuating the corresponding operating elements.

In order to be able to make a decision as to whether the deactivation of the signalling can be performed automatically or has to be performed, it is ascertained whether the reduction of the driving speed v of the vehicle during the emergency stopping maneuver is greater or smaller than the predetermined speed reduction value $v_1$, of 30% for example, and/or whether or not the predetermined time value $t_1$ dependent on speed, of 5 seconds for example, has elapsed since initiating the emergency stopping maneuver.

Depending on the speed reduction value $v_1$ and/or the predetermined time value $t_1$ dependent on the speed, it is decided when fulfilling the aborting criterion, namely the vehicle user taking over the task of driving, whether or not the vehicle poses a potential threat to other road users, wherein the signalling is correspondingly maintained or is automatically deactivated.

If the vehicle user takes over the task of driving of the vehicle either when the reduction of the current driving speed v is greater than the speed reduction value $v_1$ and/or when the duration of time between initiating and aborting the emergency stopping maneuver exceeds the predetermined time value $t_1$ dependent on speed, then the signalling for the road users in the surroundings of the vehicle is not deactivated.

If the vehicle user accelerates the vehicle after the vehicle user has taken over the task of driving the vehicle, wherein the vehicle user has still not deactivated the signalling and the vehicle has reached a current driving speed v that is greater than the predeterminable speed value $v_2$, as is shown by the second speed curve G2, then it is provided that the signalling is then lifted and the hazard light and/or the dipped beam are or is automatically returned to the state before initiating the emergency situation. In such a case, it can be assumed that the vehicle no longer poses a threat to further road users, in particular following road users, due to its current driving speed v.

By using the method, it is not necessary for the vehicle user to manually deactivate the signalling as a warning measure in the event of aborting the emergency stopping maneuver by taking over the task of driving when the conditions described above and the aborting criterion are met in good time.

If the vehicle is a bus, the emergency stopping maneuver can be initiated by means of a passenger pushing a button, for example, i.e., a passenger of the bus. If such an initiation of the emergency stopping maneuver is carried out without authorisation or accidentally and the vehicle user does not have any limitations in relation to carrying out the task of driving, then all measures corresponding to the emergency stopping maneuver, i.e., the braking and signalling, are nevertheless firstly initiated. In such a case, the vehicle user will fulfil the aborting criterion, namely taking over the task of driving, in good time, such that the current driving speed v is not reduced in such a way that the vehicle poses a threat to further road users. The signalling is lifted, wherein the hazard light and the dipped beam are deactivated automatically in such a way that no additional effort for the vehicle user and a resulting distraction of the vehicle user emerges.

The invention claimed is:

1. A method for operating a vehicle, comprising the steps of: continuously checking during a driving operation whether an emergency situation is present in the vehicle and, when the emergency situation is detected, initiating an emergency stopping maneuver for safely parking the vehicle, signalling the emergency situation to a road user in surroundings of the vehicle, aborting the emergency stopping maneuver when a vehicle user takes over a task of driving the vehicle, and determining whether the vehicle constitutes a danger to road users in the surroundings of the vehicle after the aborting of the emergency stopping maneuver as a result of a reduced vehicle speed due to the emergency stopping maneuver; wherein the signalling of the emergency situation is automatically deactivated after the aborting of the emergency stopping maneuver when it is determined that the vehicle does not constitute the danger to road users in the surroundings of the vehicle after the aborting of the emergency stopping maneuver by determining that an ascertained duration of time between the initiating and the aborting of the emergency stopping maneuver is smaller than a predetermined time value which varies with a driving speed of the vehicle and that an ascertained reduction of the driving speed of the vehicle between the initiating and the aborting of the emergency stopping maneuver is smaller than a predetermined speed reduction value; and wherein the signalling of the emergency situation is continued after the aborting of the emergency stopping maneuver when it is determined that the vehicle does constitute the danger to road users in the surroundings of the vehicle after the aborting of the emergency stopping maneuver.

2. The method according to claim 1, wherein the signalling is automatically carried out after exceeding the predetermined time value and/or after exceeding the predetermined speed reduction value when the vehicle is accelerated to a driving speed that exceeds a predetermined speed value.

3. The method according to claim 1, wherein a hands-free driving by the vehicle user and a duration of time of the hands-free driving is recorded to ascertain the emergency situation.

4. The method according to claim 3, wherein the emergency stopping maneuver is initiated when the duration of time of the hands-free driving exceeds a predetermined time threshold value.

5. The method according to claim 1, wherein a hazard light or a dipped beam of the vehicle is activated as the signalling.

6. The method according to claim 1 further comprising the step of monitoring the vehicle user by captured image data of a driver observation camera.

7. The method according to claim 1, wherein the vehicle is decelerated in its current driving lane until the vehicle reaches a standstill when the emergency situation is present and the emergency stopping maneuver is initiated.

8. The method according to claim 1, wherein when carrying out the emergency stopping maneuver, the driving speed of the vehicle is reduced while taking a further road user in the surroundings of the vehicle into consideration.

* * * * *